Jan. 8, 1952     O. RASOR     2,582,065

METHOD OF CONSTRUCTING CYLINDRICAL CONTAINERS

Filed May 18, 1948     2 SHEETS—SHEET 1

INVENTOR.
Orval Rasor
BY
Atty.

Jan. 8, 1952　　　　　　　O. RASOR　　　　　　2,582,065
METHOD OF CONSTRUCTING CYLINDRICAL CONTAINERS
Filed May 18, 1948　　　　　　　　　　　　2 SHEETS—SHEET 2
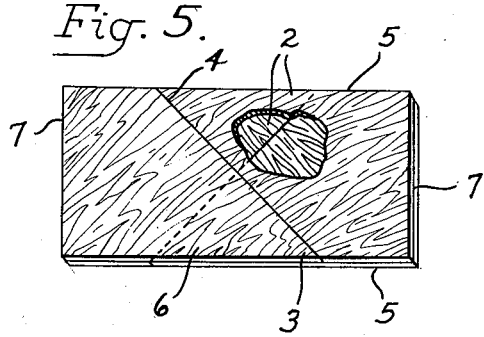
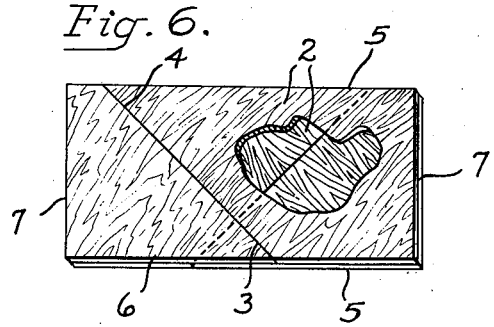
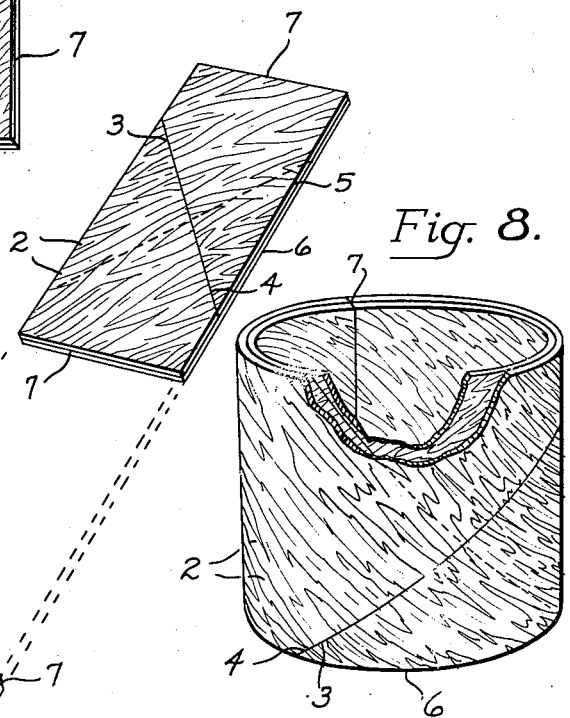
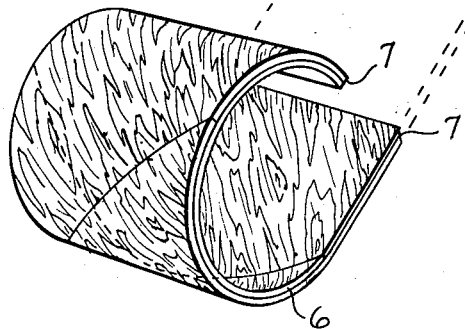
INVENTOR.
Orval Rasor
BY
Atty.

Patented Jan. 8, 1952

2,582,065

UNITED STATES PATENT OFFICE 2,582,065

METHOD OF CONSTRUCTING CYLINDRICAL CONTAINERS

Orval Rasor, Portland, Oreg.

Application May 18, 1948, Serial No. 27,735

7 Claims. (Cl. 144—309)

My invention pertains to cylindrical tubings, and relates particularly to a novel method of making helically cross-wound cylindrical tubings of multi-ply wood veneer from a single sheet of prepared material.

In the manufacture of cylindrical containers and tubings from thin wood veneers, it is recognized that greater strength and resistance to impact obtains in structures embodying the helical cross-wound construction, as compared with the vertical-and-horizontal wound construction. In the former, the grain of the wood extends in a direction obliquely to the circumferential and longitudinal dimensions of the cylinder and the grain in one layer of the multi-ply construction is crossed with respect to the grain in an adjacent ply. In the latter construction, the grain of the wood in one ply extends parallel with the circumferential dimension of the cylinder, and the grain in the adjacent ply extends parallel with the longitudinal dimension of the cylinder.

The stresses impressed from any angle upon a cylindrical object produces either an elongation of the cylinder or a reduction in the circumference thereof, or both. That is, the stresses are impressed in directions parallel with the longitudinal and circumferential dimensions of the cylinder. Since fibrous material has substantial strength only in the direction of its grain, it is evident that the plies of a vertical-and-horizontal type construction will resist only those forces impressed in the direction of their grain, and no help is obtained from the adjacent ply because the force is impressed normal to the direction of the grain, in which direction the wood has but little resistive strength. With the helical cross-wound construction, on the other hand, a force exerted in the direction either of the circumferential or of the longitudinal dimension of the cylinder will be impressed upon the fibers of each ply at an angle obliquely to the direction of said fibers. Both the vertical and horizontal components of force thus impressed upon the fibers are capable of resistance in all of the plies, with a consequent increase in strength of the cylinder. Lighter material may thus be used, reducing the cost of construction and subsequent freight charges.

It has heretofore been the practice in constructing cylindrical containers and tubings of wood veneer to first wrap one strip of veneer helically about a long mandrel and then to wind a second strip diagonally across and over the first, securing the two plies together with an adhesive. Additional plies were provided, as desired, but time had to be allowed for each previous adhesive layer to set. The long tube thus prepared was later cut to desired lengths. Such procedure is inherently time consuming, and production cost increases while the mandrel and laborers remain idle during the setting of the adhesive.

It is a principal object of my invention to provide a method of making helically cross-wound tubings of multi-ply veneer from a single strip of material comprising a series of rectangular sections of wood veneer.

Another object is to provide a method of making a single strip of wood veneer comprising alternate sections of oppositely disposed grain extending obliquely to the dimensions of said strip from which helically cross-wound tubings may be constructed.

A further object is to provide in the manufacture of cylindrical containers the method of cutting veneer stock to form rectangular sections having grain extending obliquely to the dimensions of said section, one of said dimensions being substantially equal to the circumference, or an odd fraction or whole multiple of the circumference, of said container, and the other of said dimensions being equal to the length of said container.

A further object is to provide in the manufacture of cylindrical containers the method of cutting veneer stock to form rectangular sections having grain extending obliquely to the dimensions of said section, which cutting is characterized by substantially no loss by scrapping of the source material.

A still further object of my invention is to provide a method of making helically cross-wound tubings of multi-ply wood veneer from a single strip of material comprising alternate sections of oppositely disposed grain extending obliquely to the dimensions of said strip, one dimension of said sections being substantially equal to the circumference, or an odd fraction or whole multiple of the circumference, of said tubing, and the dimension perpendicular to said first named dimension being equal to the length of said tubing.

These and other objects and advantages of my invention will appear from the following detailed description taken in connection with accompanying drawing, in which:

Fig. 5 is a perspective view of a modification of my invention, showing two of the sections illustrated in Fig. 2 glued together in superimposed relation, the upper section being broken away to show the crossed grain arrangement;

Fig. 6 is a perspective view similar to Fig. 5 showing the diagonal line disposed at random positions across each ply;

Fig. 7 is a perspective view of a strip comprising a multiplicity of sections shown in Fig. 5, intermediate sections being indicated by dotted lines; and Fig. 8 is a perspective view, partly in section, showing a completed tubing formed of the section illustrated in Fig. 5.

Figure 2:
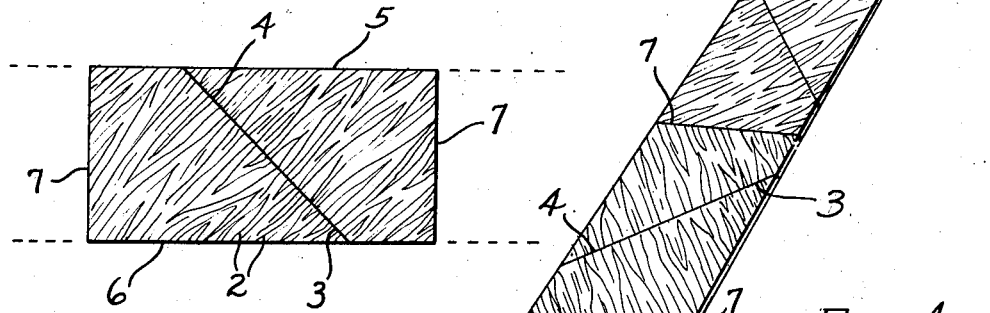
Fig. 2 is a plan view illustrating the manner in which the section shown in Fig. 1 is rearranged to form a rectangular section with the grain extending obliquely thereof.
Figure 3:
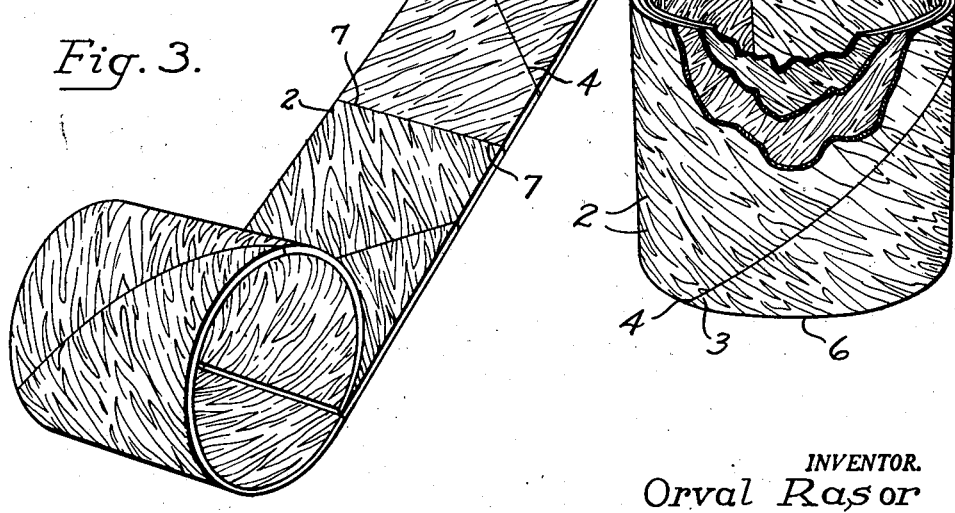
Fig. 3 is a fragmentary perspective view showing the sections of Fig. 2 assembled into a strip for forming the container or tubing of my invention.
Figure 4:
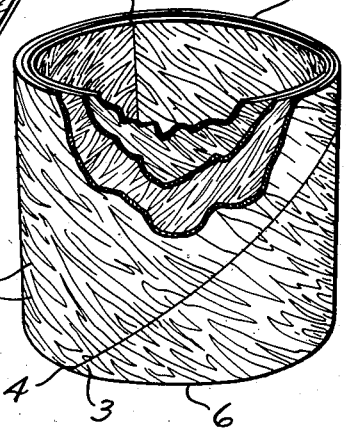
Fig. 4 is a perspective view, partly in section, of a section of completed tubing embodying my invention.

Referring particularly to Figs. 2 and 3 of the drawing, the single strip of wood veneer ultimately to be wrapped circumferentially into the form of tubing shown in Fig. 4 comprises a series of rectangular sections joined end to end. The grain in each section extends obliquely, preferably at an angle of 45°, to the dimensions of said section, and the grain in adjacent sections extends normal to each other. As shown in Fig. 3, the length of each section is substantially equal to the circumference of the tubing to be formed. Thus, the grain in each section extends obliquely to the circumferential and longitudinal dimensions of the tubing, and the grain in adjacent plies extends crosswise of each other, thereby forming the cross helix construction desired.

Figure 1:
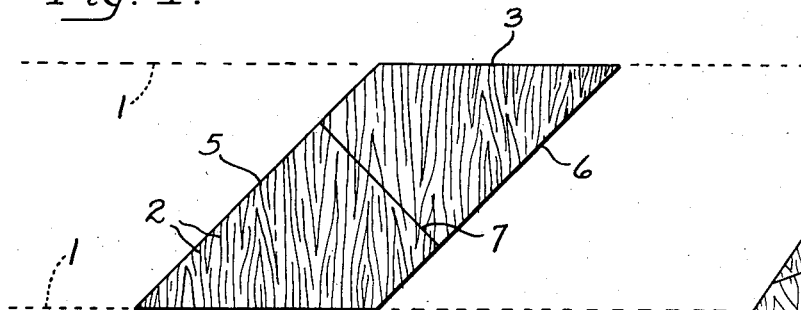
Fig. 1 is a plan view showing the manner in which sections of veneer are cut from a sheet of veneer stock as it comes from a peeling lathe, for the purposes of my invention.

Referring now to Fig. 1 of the drawing, the parallel dotted lines 1 represent the lateral edges of a strip of thin wood veneer cut from a peeler log or other source by methods well known in the art. In peeler operation, for example, the grain 2 of the wood extends transversely of the longitudinal dimension of said strip, as shown in the drawing.

In the commercial utilization of wood veneer for purposes of my invention, it is important to reduce scrapping loss to a minimum. Rectangular sections having obliquely disposed grain may be cut directly from the peeler strip, but excessive scrapping results. In order to obtain sections of the desired rectangular shape and still avoid excessive loss of source veneer, I cut the veneer strip obliquely, preferably at an angle of 45°, across the lateral dimension thereof, as shown in Fig. 1. A series of these cuts along the length of said strip produces sections of parallelogram shape having the grain thereof extending across the sections parallel with the oblique lateral sides 3 and 4 and at an oblique angle to the longitudinal sides 5 and 6. The parallelogram section is then cut along a perpendicular line 7 extending between the longitudinal sides 5 and 6. The severed parts are then rearranged, with the lateral sides 3 and 4 glued in abutting relationship, as shown in Fig. 2, to form the rectangular section desired.

It is to be noted that the sum of the lengths of the sides 5 and 6 corresponds to the longitudinal dimension of the rectangular section to be formed which in turn is substantially equal to the circumference of the tubing to be formed. As will be shown hereinafter, the longitudinal dimension of the rectangular section may also be an odd fraction or a whole multiple of the circumference of the tubing. The dimension along the perpendicular severance line 7, which forms the ends of the rectangular section, is equal to the length of said tubing. It is apparent that the formation of rectangular sections of a given dimension utilizes considerably less source material by the parallelogram method described above than would the method of cutting the rectangular sections directly from the sheet of veneer. With this latter method, not only must the width of the sheet be wider to accommodate the rectangular section, but scraps are produced at each end of said sections.

In the manufacture of cylindrical containers and tubings it is commercially advantageous to utilize veneers of standard dimension. Peeler veneers of present production are generally of 96 inch width. In order to reduce scrapping to a minimum, it is likewise desirable to select a diameter for the tubing to be made which will most efficiently utilize the sections cut from the standard veneers. Thus, for example, with the lateral dimension of the veneer stock being of standard 96 inches, measured perpendicularly between lines 1 in Fig. 1 of the drawings, the sum of the lengths of the longitudinal sides 5 and 6, when cut at an angle of 45°, is approximately 135 inches. A tube 21 inches in diameter may be formed by a double wrapping of this length of section, with about 3 inches remaining for a scarf joint, if desired. The parallelogram section may if desired be cut in two equal pieces having lengths substantially equal to the circumference of said 21 inch tubing.

It may sometimes be found desirable or advantageous to provide sections of longer length than 135 inches. In this case two or more of the parallelogram sections may be joined along their oblique lateral sides 3 and 4 and a perpendicular cut 7 made at any location across the longitudinal sides 5 and 6 to form a rectangular section of desired length. Similarly, rectangular sections of lengths shorter than the circumference of the tubing may be utilized. Thus, a tubing 64 inches in diameter requires one and one-half of the 135 inch strips obtained from the standard veneer stock. The strips may be cut in two, forming two parallelograms of 67.5" length, and rectangular sections of similar length are prepared therefrom. Three of these sections joined end to end are substantially equal to the circumference of the tubing. With alternate sections inverted to present grain extending crosswise of the grain in adjacent sections, the fourth section, which overlies the first section, will have its grain crosswise of the grain in the first section, as is required in the formation of the cross helix wind. It is apparent, therefore, that sections shorter than the circumference of the tubing must have lengths equal to odd fractions of the circumference in order to achieve the cross helix construction. With lengths equal to even fractions of the tubing circumference, overlying sections will have grain extending in the same direction, rather than crossed in the manner desired.

Whatever length of rectangular section is chosen, it is recommended that the severance line 7 be made at random positions through the various parallelogram sections comprising the strip in order to avoid crossing of the diagonal joint in adjacent plies of rectangular sections. The parts comprising each section are glued together along their abutting edges. The several sections comprising the strip to be formed are then assembled end to end with alternate sections inverted to present oppositely disposed grain in adjacent sections and glued in place. Scarf joints, tongue-and-groove connections, or other forms of connections may be employed, as desired.

Having assembled and united the sections comprising the strip illustrated in Fig. 3, with alternate sections reversed to present oppositely directed grain structures in adjacent sections, one end of said strip is secured on a rotary mandrel, glue is applied to one side of the strip and the latter is wrapped circumferentially to form the helically cross-wound tubing structure illustrated in Fig. 4. The tubing thus formed may be used for many purposes without further change. Cyclindrical containers may be formed with said tubing by securing a bottom section therein and providing a cover, by conventional methods well known in the art.

By employing the method hereinabove described, selected species of wood veneers may be placed at desired locations along the prepared strip in order to provide liners or external coverings of particular woods. For example, a section of hardwood may be provided at the end of said strip in order that a tubing subsequently formed therefrom will have a surface or an inner liner of hardwood, depending upon which end of the strip is first turned upon the winding mandrel.

In winding the composite strip of wood veneer upon a rotating mandrel tension should be exerted upon the strip sufficiently to maintain the latter in taut or slightly stretched condition. This is desirable in order that the initial convolution be wrapped closely about the mandrel and the succeeding turns closely overlie each other. It has been observed, particularly in cases where very thin veneers are used that the strength of the strip may be insufficient to sustain the desired tension. In such cases the strip becomes stretched and distorted to excessive degrees and, in some instances, the wood fibers separate completely, forming large open spaces or causing the strip to break. I overcome this difficulty by forming a composite strip of multiply veneers, as illustrated in the modification shown in Figs. 5-8, inclusive. In this construction two or more of the preformed rectangular sections shown in Fig. 2 are glued together in face to face relation. Alternate sections are inverted so that the grain in adjacent plies is disposed crosswise of each other, as is best shown in Figs. 5 and 6. In this manner the stresses tending to separate the fibers in one ply are resisted by the normally disposed fibers in the adjacent ply. Such construction permits the application of considerable tension on the composite strip without noticeable distortion, splitting, or other adverse effects resulting therefrom.

It is preferred to glue the tight sides of the veneers together to form the multi-ply sections. With the tight sides glued together the subsequent bending of the section exerts its greatest force on the glue line and the adjacent tight sides of the veneers. The inner loose side tends to close as the bend is made while the outer loose side stretches about the circumference of the tubing being formed. If the loose sides of the veneers are glued together, the subsequent bending is resisted by the inner tight side which is less capable of contraction than is the loose side. This resistance may be of sufficient magnitude to cause the outer tight side to be stretched excessively thereby to crack and check during the formation of the tubing.

The multi-ply sections may be glued end to end to form a composite strip as indicated in Fig. 7, alternate sections being inverted to present oppositely disposed grain in adjacent sections, as previously explained. Alternatively, but one multi-ply section may be turned about a mandrel and glued at the adjoining ends to form a cylindrical tubing, as is illustrated in Fig. 8 of the drawings.

It has been recommended hereinbefore that the severance line 7 be made at random positions through the various parallelogram sections in order to avoid exact intersection of the diagonal joint in adjacent plies. Such is also preferred in the preparation of multi-ply sections whenever practicable. In Fig. 6 the length of the section is not sufficient to prevent overlapping of the diagonal joint in the superimposed layers, but the random cutting does prevent accumulation of said joints in one location in the case where several sections comprising an elongated strip are wrapped circumferentially to form a thick wall tubing.

Although the individual multi-ply sections shown in Figs. 5-8 are formed with both plies lying within the marginal confines of each other, it is contemplated that the plies may be shifted longitudinally of each other to provide a step joint at each end. An overlapping joint is thus provided by which the ends of the section are more positively connected. Where more than two rectangular sections comprise a multiply section, alternate layers may be so shifted to provide offset joints by which the ends may be interconnected.

I claim:

1. The method of making tubings comprising, cutting sheets of wood veneer obliquely across the width thereof at predetermined intervals along its length to form sections of rhomboid shape having a perpendicular width between longitudinal sides equal to the length of said tubing, cutting the rhomboid sections through said perpendicular width, forming rectangular sections having the grain disposed obliquely to the sides of said sections by rearranging the pieces cut from said rhomboid, arranging and uniting said rectangular sections in abutting relationship along the edges representing the longitudinal dimensions of said tubing with the grain in adjacent sections being disposed crosswise of each other, and wrapping the strip of united rectangular sections circumferentially to form tubing.

2. The method of making helically cross-wound tubings of multi-ply wood veneer comprising, cutting sheets of wood veneer at an angle of 45° across the width thereof at predetermined intervals along its length to form sections of parallelogram shape having a perpendicular width between longitudinal sides equal to the length of said tubing, the longitudinal dimension of said sections being substantially equal to the circumference of said tubing times an odd fraction or whole integer, cutting the parallelogram sections through said perpendicular width, rearranging and uniting the oblique ends of the cut parallelogram sections to form rectangular sections of wood veneer having the grain disposed at an angle of 45° to the sides of said section, arranging and uniting said rectangular sections in abutting relationship along the edges representing the longitudinal dimension of said tubing with the grain in adjacent sections being disposed crosswise of each other, and wrapping the strip of united rectangular sections circumferentially to form a multi-ply tubing.

3. The method of making helically cross-wound tubings of multi-ply wood veneer comprising, cutting sheets of wood veneer obliquely across the width thereof at predetermined intervals along its length to form sections of parallelogram shape having a perpendicular width between longitudinal sides equal to the length of said tubing, uniting parallelogram sections along their oblique lateral sides to form composite parallelogram sections, cutting the parallelogram sections through said perpendicular width, rearranging and uniting the oblique ends of the cut parallelogram sections to form rectangular sections of wood veneer having the grain disposed obliquely to the sides of said section, arranging and uniting said rectangular sections in abutting relationship along the edges representing the longitudinal dimension of said tubing with the grain in adjacent sections being disposed crosswise of each other, each of said rectangular sections being of such predetermined length that overlying sections in the multi-ply tubing subsequently formed present grain crosswise of each other, and wrapping the strip of united rectangular sections circumferentially to form a multi-ply tubing.

4. The method of making helically cross-wound tubings of multi-ply wood veneer comprising, cutting sheets of wood veneer obliquely across the width thereof at predetermined intervals along its length to form sections of parallelogram shape having a perpendicular width between longitudinal sides equal to the length of said tubing, the longitudinal dimension of said sections being substantially equal to the circumference of said tubing, cutting the parallelogram sections through said perpendicular width, rearranging and uniting the oblique ends of the cut parallelogram sections to form rectangular sections of wood veneer having the grain disposed obliquely to the sides of said sections, one of the dimensions of said rectangular sections being substantially equal to the circumference of the tubing, the other dimension of said sections being equal to the length of said tubing, arranging and uniting said rectangular sections in abutting relationship along the edges representing the longitudinal dimension of said tubing with the grain in adjacent sections being disposed crosswise of each other, and wrapping the strip of united rectangular sections circumferentially to form a mutli-ply tubing.

5. In the manufacture of cylindrical containers, the method of making helically cross-wound tubings of multi-ply wood veneer, comprising, cutting sheets of selected species of wood veneer obliquely across the width thereof at predetermined intervals along its length to form sections of parallelogram shape having a perpendicular width between longitudinal sides equal to the length of said tubing, cutting the parallelogram sections through said perpendicular width, rearranging and uniting the oblique ends of the cut parallelogram sections to form rectangular sections of selected species of wood veneer having the grain disposed obliquely to the sides of said sections, arranging and uniting said rectangular sections in abutting relationship along the edges representing the longitudinal dimension of said tubing with the grain in adjacent sections being disposed crosswise of each other and with selected species of wood arranged in predetermined positions to be ultimately disposed in desired locations in the tubing, each of said rectangular sections being of such predetermined length that overlying sections in the multi-ply tubing subsequently formed present grain crosswise of each other, and wrapping the strip of united rectangular sections circumferentially to form a multi-ply tubing having selected species of wood veneers arranged in desired locations.

6. The method of making helically cross-wound tubings of multi-ply wood veneer comprising, cutting sheets of wood veneer obliquely across the width thereof at predetermined intervals along its length to form sections of parallelogram shape having a perpendicular width between longitudinal sides equal to the length of said tubing, the longitudinal dimension of said sections being substantially equal to the circumference of said tubings times an odd fraction or whole integer, cutting the parallelogram sections through said perpendicular width, rearranging and uniting the oblique ends of the cut parallelogram section to form rectangular sections of wood veneer having the grain disposed obliquely to the sides of said section, one of the dimensions of said rectangular section being substantially equal to the circumference of the tubing times an odd fraction or a whole integer, the other dimension of said section being equal to the length of said tubing, arranging and uniting at least one ply thicknesses of said rectangular sections in abutting relationship along the edges representing the longitudinal dimension of said tubing with the grain in adjacent plies and sections being disposed crosswise of each other, and wrapping the strip of united rectangular section circumferentially to form a multi-ply tubing.

7. The method of making tubings comprising, cutting sheets of wood veneer obliquely across the width thereof at predetermined intervals along its length to form sections of parallelogram shape having a perpendicular width between longitudinal sides equal to the length of said tubings, cutting the parallelogram sections through said perpendicular width to form rectangular sections having grain disposed obliquely to the sides of said sections, uniting a plurality of said rectangular sections in face to face relationship to form multi-ply rectangular sections therefrom with adjacent plies presenting grain crosswise of each other, arranging and uniting said multi-ply rectangular sections in abutting relationship along the edges representing the longitudinal dimension of said tubing with the grain in adjacent sections being disposed crosswise of each other, each of said rectangular sections being of such predetermined length that overlying sections in the multi-ply tubing subsequently formed present grain crosswise of each other, and wrapping the strip of united rectangular sections circumferentially to form a multi-ply tubing.

ORVAL RASOR.

REFERENCES CITED

The following references are of record in the file of this patent:

UNITED STATES PATENTS

| Number | Name | Date |
|---|---|---|
| 1,443,196 | Proctor | Jan. 23, 1923 |
| 1,645,936 | Schlesinger | Oct. 18, 1927 |
| 2,379,258 | Smith | June 26, 1945 |
| 2,449,526 | Dunne | Sept. 14, 1948 |

FOREIGN PATENTS

| Number | Country | Date |
|---|---|---|
| 492,738 | Great Britain | Dec. 21, 1936 |